(12) United States Patent
Iwayama et al.

(10) Patent No.: US 6,735,615 B1
(45) Date of Patent: May 11, 2004

(54) STATUS CHANGE NOTIFICATION SYSTEM FOR USE IN CHAT SYSTEM CHANNEL

(75) Inventors: Noboru Iwayama, Kawasaki (JP);
Kenichi Sasaki, Kawasaki (JP);
Tatsuro Matsumoto, Kawasaki (JP);
Hitoshi Yamauchi, Kawasaki (JP);
Hidenobu Ito, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/494,539

(22) Filed: Jan. 31, 2000

(30) Foreign Application Priority Data

Mar. 1, 1999 (JP) ............................................. 11-052417

(51) Int. Cl.[7] .............................................. G06F 15/16
(52) U.S. Cl. ........................ 709/204; 709/205; 709/206; 709/207
(58) Field of Search ................................ 707/500, 201; 709/213, 200, 204, 206, 207, 205; 370/263

(56) References Cited

U.S. PATENT DOCUMENTS

| | | | | |
|---|---|---|---|---|
| 5,471,629 A | * | 11/1995 | Risch | 707/201 |
| 5,548,753 A | * | 8/1996 | Linstead et al. | 707/1 |
| 5,592,664 A | * | 1/1997 | Starkey | 707/1 |
| 5,826,253 A | * | 10/1998 | Bredenberg | 707/2 |
| 5,829,001 A | * | 10/1998 | Li et al. | 707/10 |
| 5,924,096 A | * | 7/1999 | Draper et al. | 707/10 |
| 6,041,327 A | * | 3/2000 | Glitho et al. | 707/10 |
| 6,061,692 A | * | 5/2000 | Thomas et al. | 707/200 |
| 6,092,213 A | * | 7/2000 | Lennie et al. | 714/3 |
| 6,185,613 B1 | * | 2/2001 | Lawson et al. | 709/224 |
| 6,282,565 B1 | * | 8/2001 | Shaw et al. | 709/206 |
| 6,408,336 B1 | * | 6/2002 | Schneider et al. | 709/229 |
| 6,418,437 B1 | * | 7/2002 | Cole | 707/8 |
| 6,477,548 B1 | * | 11/2002 | Nihei | 707/204 |
| 6,564,244 B1 | * | 5/2003 | Ito et al. | 709/204 |
| 6,584,494 B1 | * | 6/2003 | Manabe et al. | 709/204 |
| 2001/0023430 A1 | * | 9/2001 | Srinivasan | 709/204 |
| 2002/0091697 A1 | * | 7/2002 | Huang et al. | 707/10 |

* cited by examiner

*Primary Examiner*—Krisna Lim
(74) *Attorney, Agent, or Firm*—Staas & Halsey LLP

(57) ABSTRACT

A notification is sent to a group of information terminals that conduct simultaneous communication by participating in a channel. The status change notification system includes a database DB and monitoring means 1. The DB is disposed outside the channel. The monitoring means 1 monitors an occurrence of a status change in the DB, and generates a notification of a status change when a status change occurs. At least one of the group of information terminals includes notifying means 3. The notifying means 3 receives a notification of status change from the monitoring means 1. The notifying means sends the notification to other of the group of information terminals to notify of the status change in a broadcasting manner.

20 Claims, 15 Drawing Sheets

| Name of DB | Terminal to be Notified |
|---|---|
| DB1 | Agent Terminal A;  Agent Terminal B |

| Name of DB | Terminal to be Notified |
|---|---|
| DB2 | Agent Terminal B |

| Database | Channel |
|----------|---------|
| DB1 | #CH1 |

| Database | Channel |
|----------|---------|
| DB1, DB2 | #CH2 |

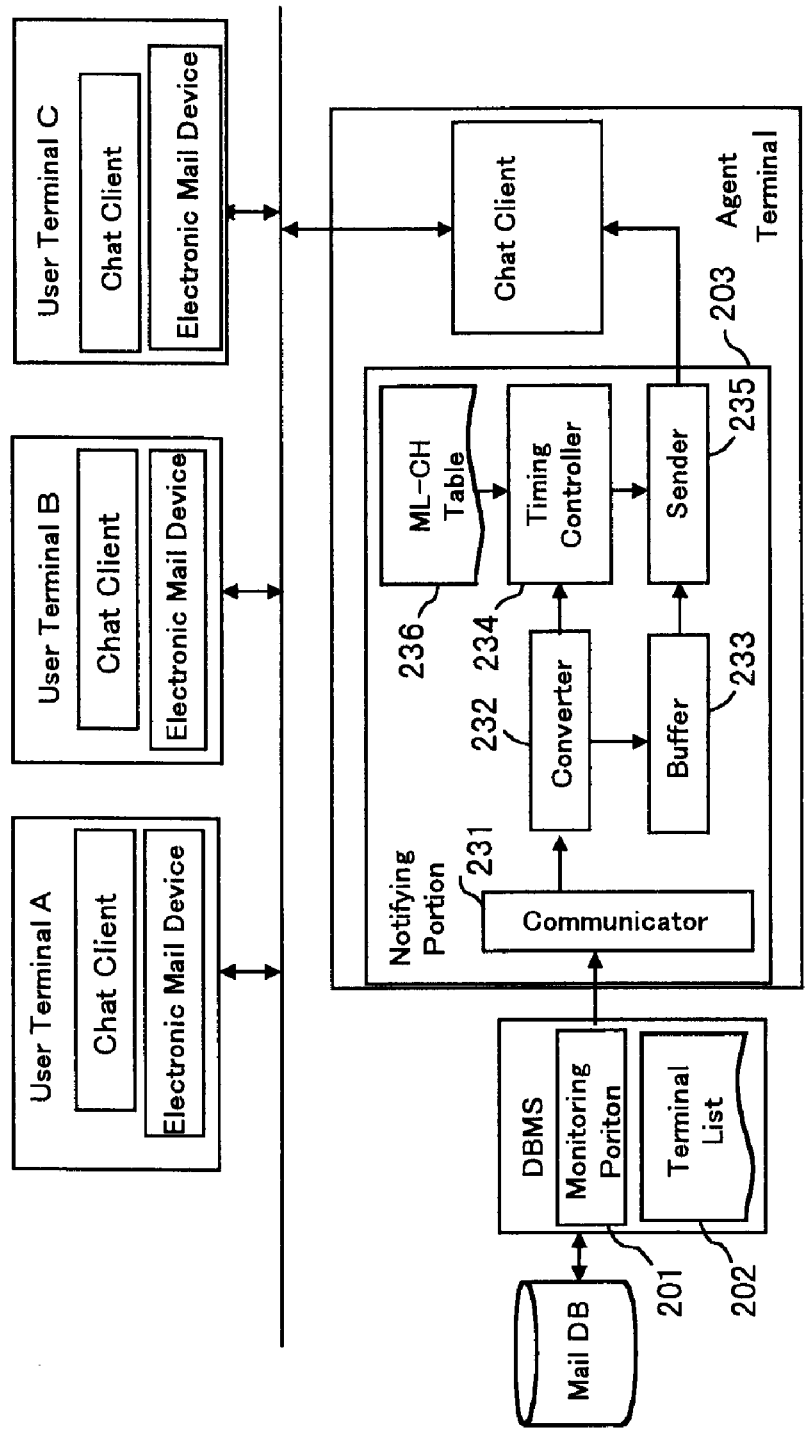

Fig. 12

| ML-1 | CH-1 |
|------|------|
| ML-2 | CH-2 |
| ⋮ | ⋮ |

Fig. 14

| ML - 1 | user-a@fujitsu.co.jp, user-b@fujitsu.co.jp |
| ML - 2 | user-c@fujitsu.co.jp, user-d@fujitsu.co.jp |
| ⋮ | ⋮ |

| Database | Channel | Keyword |
|---|---|---|
| DB1 | #CH1 | |

| Database | Channel | Keyword |
|---|---|---|
| DB1, DB2 | #CH2 | "Stock Quote" |

STATUS CHANGE NOTIFICATION SYSTEM FOR USE IN CHAT SYSTEM CHANNEL

BACKGROUND OF THE INVENTION

The present invention relates to a computer system that activates and facilitates communication among a plurality of users on a computer network.

Definition of Terms

Hereinafter, a chat system is a computer communication system that includes a chat server and chat clients, in which a plurality of chat clients (computer terminals) communicate simultaneously bi-directionally over a common network, thereby defining a virtual space. The term channel refers to a virtual space or a network shared by a plurality of users, in which such conversations occur.

A mailing list system refers to a system that distributes electronic mail in a broadcasting manner to a predetermined group of electronic mail addresses. The system administers a List of the groups of electronic mail addresses, and representative addresses that represent the groups. Each representative mail address is a special address that is used for forwarding electronic mail to a group of electronic mail addresses. Electronic mail sent to a representative mail address distributed to each of the electronic mail addresses in a corresponding list associated with the representative mail address. Hereinafter, the representative mail address is referred to as mailing list.

Status changes within the chat channel can easily be observed by the clients communicating on that chat channel. Such changes include a property change of the chat channel, messages transmitted to the chat channel, or users joining or quitting the channel. However, status changes computer activities outside the chat channel cannot be recognized by participants in the chat channel. Examples of such status changes outside network or chat channel include inputting, deleting, and updating of information in external databases, and posting of e-mail associated with a mailing list.

The term database mentioned above broadly refers to any compilation of information. For instance, the term database may refer to a traditional database or may refer to webpages on the WWW (World Wide Web).

Related Technologies

Recently, use of communication system on a computer network such as chat system and electronic mail has increased rapidly. Accordingly, various means have been developed for activating and facilitating communications among users based on the communication system.

For instance, there is known an electronic communication system developed by the inventors of the instant application whereby a user can access an external database from chat system. The electronic communication system is disclosed in Japanese patent application Hei 10-243230 wherein a user can search and/or register information in an external database from chat system. In such technology, information regarding persons who have accessed the database and the context in which those persons accessed the database, can be obtained on a real-time basis, thereby promoting information sharing among users.

Another related technology promotes communication using electronic mail system is disclosed in U.S. Pat. No. 5,548,753 in which notification is sent via e-mail of status changes of a predetermined database.

Problems to be Solved by the Invention

The aforementioned Japanese patent application Hei 10-243230 discloses a status change notification system wherein once a user participating in a chat searches or enters information in a database, all the users in the same chat channel are notified of the search results or the changes in the database. However, when a user who is not participating in the channel, such as an administrator of a database, makes a change in the database by registering, deleting, or updating information, other users cannot be notified of the status change of the database.

On the other hand, the aforementioned U.S. Pat. No. 5,548,753 discloses a status change notification system in which status changes in a database are notified to users by electronic mail. Therefore, there is a time lag between the time when the status change in the database actually occurs and the time when the user actually receives the notification electronic mail. Consequently, a user cannot act according to the new status during the time lag. Also, a user cannot tell whether or not other users have already received the notification electronic mail. Therefore, a user cannot always assume that he or she shares the same information with other users.

SUMMARY OF THE INVENTION

One of the objects of the present invention is to provide a technology that notifies users of changes in status of a separate, external database in real-time, thereby allowing users to conduct communication based on an assumption that all the users share the same information.

Another object of the present invention is to provide a status change notification method for use in a simultaneous two-way communication system in which a plurality of user terminals communicates via a common network. The status change notification method comprising steps of:

A: detecting an occurrence of a status change outside the network; and

B: notifying the status change in a broadcasting manner to the plurality of user terminals via the networks.

Examples of a communication system include a chat system in which users send messages to each other in chat channel. A status change outside the network is a status change that occurs somewhere other than within the chat channel. Examples of status change include update of an external DB and/or webpages in the WWW, and posting of an electronic mail in a mailing list. In the case where a status change is defined as posting of new news in a news webpage, the update of the webpage is detected. Then, notification of the update is transmitted to a channel #CH1 in the form of a text message. Since participants of the channel #CH1 receive the notification message at the same time, the participants can continue their conversation with the assumption that all the users on the channel #CH1 are aware of the update. In this case, the webpage is configured with the status change notification method such that a notification of changes or updates cause a notification to be sent to the predetermined channel #CH1.

In accordance with another object of the present invention a status change notification system includes a group of information terminals and monitoring means. The group of information terminals is used for conducting simultaneous two-way communication via a network. The monitoring means monitors changes in status occurring outside the network, and transmits a signal. At least one of the group of information terminals has notifying means for receiving the signal representing notification of the status change from the monitoring means and sends the notification to the network to notify other of the group of information terminals of the status change in a broadcasting manner.

The status change notification system of the present invention has similar effects as the status change notification method discussed above.

In accordance with still another object of the present invention a status change notification system includes a group of information terminals, storing means, and monitoring means. The group of information terminals is adapted to conduct simultaneous two-way communication via a network. The storing means is disposed outside the network for storing information therein. The monitoring means monitors status changes in the storing means, and is adapted to generate a signal when a status change occurs, the signal representing a notification of status change. At least one of each group of information terminals has notifying means for receiving the notification of the status change from the monitoring means, and means for sending the notification to the network to notify others of the group of information terminals of the status change in a broadcasting manner.

For instance, a plurality of information terminals in a chat system participate in channel #CH1 via chat clients in each respective information terminal. The monitoring means monitors inputting, deletion, or update of information in an external DB. Any status change in the DB is detected by the monitoring means and a signal is generated by the notifying means. The notifying means transmits the signal to the channel #CH1 in the form of a test message made therein, the signal being a notification of the status change in the DB. In this way, notification of the status change in the DB is transmitted in a broadcasting manner to all of the information terminals participating in the channel #CH1.

Preferably, in the status change notification system, the monitoring means further includes a first correlation table that provides a correlation between the storing means of various databases, the monitoring means, and the notifying means. The monitoring means determines, based on the first correlation table, which chat channel should be notified of changes in the status of a particular database.

If there is more than one database, monitoring means, and notifying means, the monitoring means can cause generation of a notification of a status change in a DB to either only one notifying means or more than one notifying means, thereby notifying corresponding a chat channel or chat channels of status changes in a corresponding database. However, it should be understood that the notifying means may be configured to receive notification from either only one monitoring means or more than one monitoring means. The monitoring means can monitor either only one DB or more than one DBs. Since the DB, the monitoring means, and the notifying means can be correlated in any desired way, the status change notification system allows flexible configuration.

Preferably, in the status change notification system, the notifying means further includes a second correlation table which correlates the networks and said notifying means. The notifying means makes determinations with respect to which network the notification should be sent based on information in the second correlation table.

For instance, if there is more than one network, the notifying means can be correlated with multiple networks, such that a notification is sent from the notifying means to a selected one of multiple networks. It is also possible to configure the status change notification system such that one network receives notifications from multiple notifying means.

Preferably, in the status change notification system, the notifying means makes a determination based on predetermined timing or conditions under which the status change notification should be sent to the network.

More specifically, the notifying means determines the timing or conditions of the notification based on needs of the users. For instance, the timing can be "when no message has been sent for 3 minutes", "only between 9:00 and 17:00", or "the time indicated by timing information in the notification."

Preferably, in the status change notification system, the notifying means includes queuing means, controlling means, and sending means.

The queuing means sets aside the status change notification sent from the monitoring means. The controlling means determines a time or event at which the status change notification should be sent, and directs the notification to be sent according to the determined timing or event. The sending means sends the status change notification from the queuing means to the network according to directions from the controlling means.

For example, the controlling means may be configured to have the notification sent out when there have been no messages sent in the chat channel for last 3 minutes. The monitoring means monitors messages to the channel. The notification sent from the monitoring means is temporarily stored in the queuing means. The controlling means checks messages in the channel, and determines when the notification can be transmitted. When the condition or conditions for the timing are met, the controlling means directs the sending means to send the notification. The sending means then sends out the oldest notification in the queuing means, according to the directions from the controlling means.

Preferably, in the status change notification system, the controlling means determines the timing of the status change notification based on status of the network or channel.

For instance, the controlling means can determine the timing based on the condition "when no message has been made for a certain period of time", as opposed to while messages are frequently being inputted.

Preferably, in the status change notification system, the controlling means determines the timing when the status change notification should be sent based on time information of the status change notification, if the status change notification from the monitoring means includes the timing information.

For instance, an advertisement for a new product is posted on a webpage in the WWW on January 8. The new product is to be publicly displayed on January 29. In this case, the controlling means can determine the timing to be January 29. The controlling means can also determine the timing based on both status of the channel and content of the notification.

Preferably, in the status change notification system, the notifying means further includes conversion means for converting the status change notification sent from the monitoring means into a predetermined format.

For instance, the conversion means converts the status change notification into a format making it is easier for users to understand. Conversion is also required if the monitoring means and the notifying means have differing communication protocols. The status change notification can also be converted such that users can distinguish the notification from regular text messages on the chat channel.

Preferably, in the status change notification system, the notifying means further includes conversion means for converting the status change notification sent from the monitoring means in a predetermined format. The information terminal further includes display means for extracting the status change notification from communication data within the network, and displaying the status change notification, which has been converted into the predetermined format. The information terminal receives the status change notification via the network.

For instance, the display means displays another window such that text messages on the chat channel and the status change notification are displayed in different windows. The notification in a predetermined format is sent from the notifying means, extracted from text messages, and displayed in the aforementioned window. The notification can be displayed either as texts or as visual images such as icons.

Still another object of the present invention is to provide a monitoring device adapted to be used with a controlling device that controls an external database having information stored therein. The monitoring device monitors changes in the database, and notifies a predetermined one of a group of information terminals of the change such that notification of the change is transmitted to the group of information terminals in a broadcasting manner. The group of information terminals conducts simultaneous two-way communications (real-time conversations) via same network.

The monitoring device has similar functions and effects as the monitoring means described above in the above described status change notification system.

Preferably, this monitoring device of the present invention has similar effects as the monitoring device used in the status change notification system discussed above.

Still another object of the present invention is to provide a notifying device disposed in at least one of a group of information terminals that are adapted to conduct simultaneous two-way communication via same network. The notifying device receives from outside the network a notification of a status change and sends the status change notification to the network at a predetermined timing such that the status change is notified to other of the group of information terminals in a broadcasting manner. The status change occurs in an external database having information stored therein.

Preferably, this notifying device of the present invention has similar functions and effects as the notifying device used in the status change notification system discussed above.

Still another object of the present invention is to provide a status change display device disposed on the information terminals that are adapted to conduct simultaneous two-way communication via same network. The display device extracts a status change notification that includes notification of a status change in an external database, and displays the status change notification visually, the database having information stored therein. The status change notification is in a predetermined format.

Preferably, this status change display device of the present invention has similar functions and effects as the status change display device in the status change notification system discussed above.

Still another object of the present invention is to provide a computer-readable recording medium having a monitor-notification program therein. The monitor-notification program is for use in a control device that controls an external database having information stored therein. The monitor-notification program is adapted to execute steps of:

A: monitoring a status change in the database; and
B: when a status change occurs, notifying a predetermined one of a group of information terminals such that notification of the status change is transmitted to the group of information terminals in a broadcasting manner, the group of information terminals conducting simultaneous two-way communication via same network.

Preferably, this computer-readable recording medium of the present invention has similar functions and effects as the status change notification system discussed above.

Examples of the recording medium are computer read/write floppy discs, hard discs, semi-conductor memory, CD-ROM, DVD, MO, etc.

Still another object of the present invention is to provide a computer-readable recording medium having a broadcasting notification program therein. The broadcasting notification program is for use in at least one of a group of information terminals that conduct simultaneous two-way communication via same network. The broadcasting notification program is adapted to execute steps of:

A: receiving from outside the network a notification that identifies a status change in an external database having information stored therein; and
B: sending the notification to the network at a predetermined timing such that the status change is transmitted to other of the group of information terminals in a broadcasting manner.

Preferably, this computer-readable recording medium of the present invention has similar functions and effects as the status change notification system discussed above.

Still another object of the present invention is to provide a computer-readable recording device having a status display program therein. The status display program is for use in information terminals that conduct simultaneous two-way communication via a single network. The status display program is adapted to execute steps of:

A: extracting a notification from communication data within the network, the notification being in a predetermined format and identifying a status change of an external database having information stored therein; and
B: outputting the extracted notification visually.

Preferably, this computer-readable recording medium of the present invention has similar functions and effects as the status change display device discussed above.

Preferably, in the status change notification system, the storing means is a mail DB that stores electronic mail. The monitoring means signals the notifying means that an electronic mail has been posted. The electronic mail is being sent to a predesignated address. The notifying means sends a notification of posting of the electronic mail to the network shared by the group of information terminals.

If electronic mail to be posted in a mailing list are stored in the DB, the users listed in the mailing list are notified of posting of the electronic mail via a message on the chat channel.

Preferably, in the status change notification system, the information terminal includes an electronic mail distributing device and a list of predetermined group of information terminals as well as the notifying means. The electronic mail distributing device is adapted to distribute electronic mails. The notifying means includes mail receiver determination means and mail sending means.

The mail receiver determination means determines mail recipients based on the list and the information terminals that share the network to which the status change notification is to sent. The mail sending means sends the status change notification to the mail recipients using the electronic mail distributing device.

More specifically, information terminals which participate in a channel are notified of the status change via chat on a real-time basis. On the other hand, information terminals which do not participate in the channel are notified of a status change in a certain DB via electronic mail.

Still another object of the present invention is to provide a mail notification device for use in an electronic mail distributing device that is adapted to send electronic mail addressed to groups of information terminals. The electronic mail is sent to each terminal of a group of information terminals. The group of information terminals conducts simultaneous two-way communication via a common network or networks. The mail notification device includes detecting means, a table, determining means, and notifying means.

The detecting means detects electronic mail addressed to a group of information terminals and determines to which address the electronic mail should be sent. The detecting means is disposed in the group of information terminals. The table correlates the groups of information terminals and the networks. The determining means determines the network of the group of information terminals to which the electronic mail is addressed based on the table. The notifying means sends the notification of posting of the electronic mail to the determined network.

For instance, an electronic mail is posted in a mailing list. Since the detecting means is listed in the mailing list, the detecting means can detect posting of the electronic mail, and determine in which mailing list the electronic mail is posted. The determining means then determines channel #CH1 that corresponds to the mailing list. The notifying means sends a notification of posting of the electronic mail to the determined channel #CH1. Information terminals that are listed in the mailing list are notified of the electronic mail on a real-time basis if they also participate in the channel #CH1.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

FIG. 11 is a diagrammatic block chart showing details of the structure of a status change notification system in accordance with a second embodiment of the present invention;

FIG. 12 is a conceptual explanatory view of a ML-CH table for use in a status change notification system in accordance with selected embodiments of the present invention;

FIG. 14 is a conceptual explanatory view of the ML table for use in a status change notification system in accordance with selected embodiments of the present invention;

DETAILED DESCRIPTION OF THE PREFERRED EMBODIMENTS

Embodiments of the present invention will now be described with reference to Figures.

BASIC STRUCTURE

Figure 1:
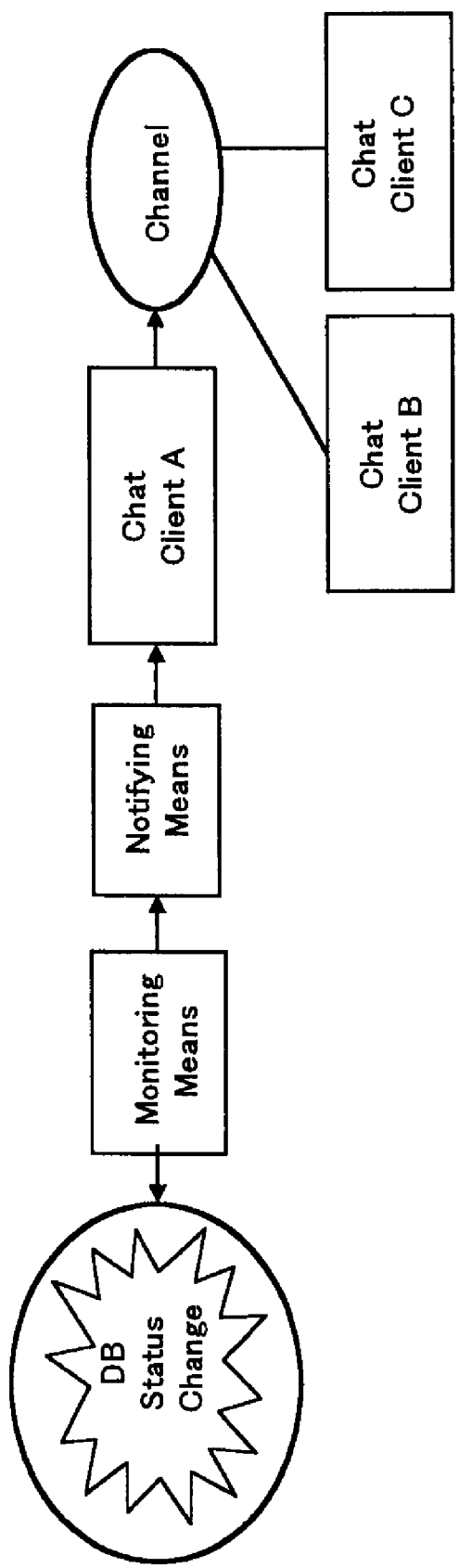
FIG. 1 is block diagram of status change notification system in accordance with the present invention.

FIG. 1 shows a basic structure of a status change notification system in accordance with the present invention. The embodiment below describes the status change notification system as applied to a chat system based on IRC (Internet Relay Chat). As shown in FIG. 1, the status change notification system includes monitoring means, notifying means, a status change generator such as a webpage or database DB, and a plurality of chat clients A, B and C that engage in a conversation on a chat channel.

The monitoring means monitors the status change generator of the webpage or database DB. Once the monitoring means detects a status change, notification of the status change is transmitted to the notifying means. The notifying means converts the information of the status change into the communication protocol of the IRC, and sends the converted information to the channel via, for instance, the chat client A. Accordingly, notification of the status change is sent to other participants of the channel, such as chat clients B and C, on a real time basis.

First Embodiment

Figure 2:
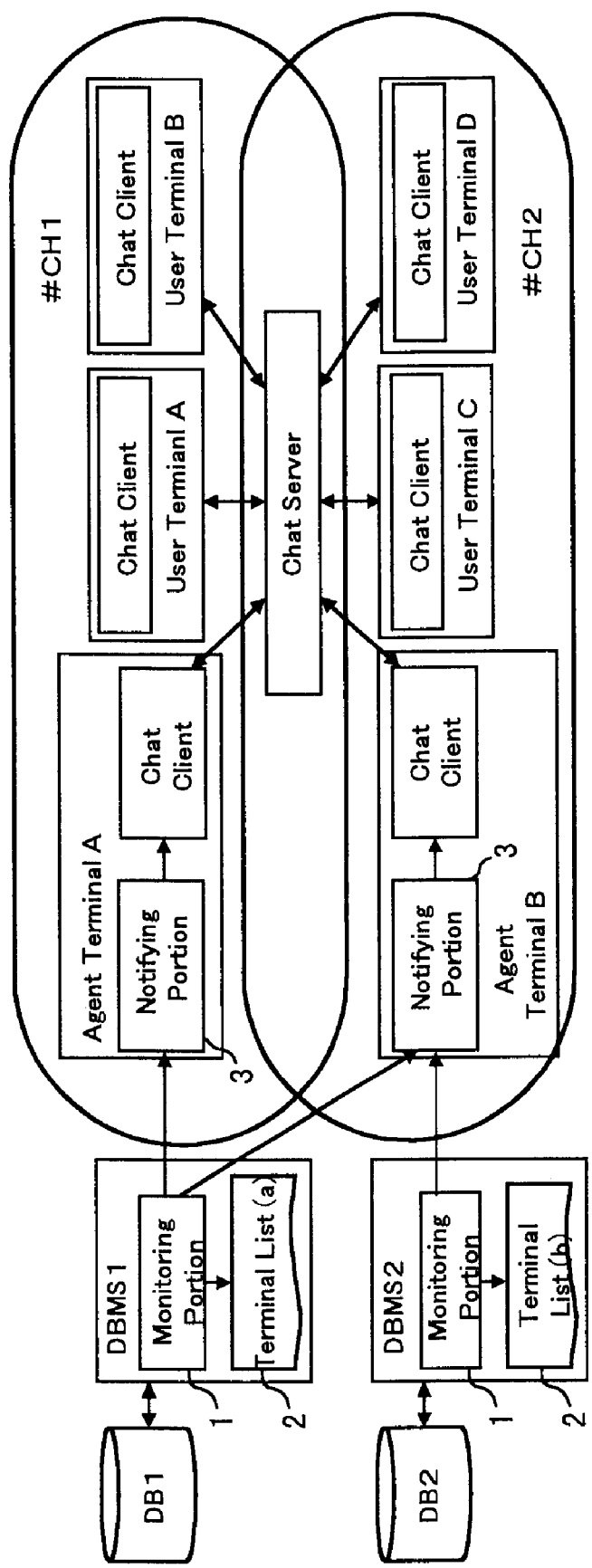
FIG. 2 is a diagrammatic block chart showing details of the structure of status change notification system in accordance with a first embodiment of the present invention.

FIG. 2 shows structure of a status change notification system in accordance with a first embodiment of the present invention. The status change notification system includes a plurality of databases 1 and 2 (hereinafter DB 1 and DB 2), database management systems 1 and 2 (herein after DBMS 1 and DBMS 2) which manage DB 1 and DB2, respectively, a plurality of agent terminals such as agent terminal A and agent terminal B, a plurality of user terminals such as user terminal A, user terminal B, user terminal C and user terminal D, and a chat server.

The agent terminals A and B and the user terminals A, B, C and D are connected to the chat server via a network, such as the Internet. However, the network may also be a local area network (LAN) or the like. The agent terminal A and the user terminals A and B participate in channel #CH1, whereas the agent terminal B and the user terminals C and D participate in channel #CH2.

DATABASE MANAGEMENT SYSTEM (DBMS)

DBMS 1 and DBMS 2, respectively, administer the DB 1 and DB 2. More specifically, DBMS 1 and DBMS 2 register, updates in, and deletes information from the corresponding DB 1 and DB 2, respectively. Administration of a database (DB) is well known technology, and therefore is not explained in greater detail. In the present embodiment, each of DBMS 1 and DBMS 2 include a monitoring portion 1 and a DB-terminal list 2.

Figures 3A, 3B, 4:
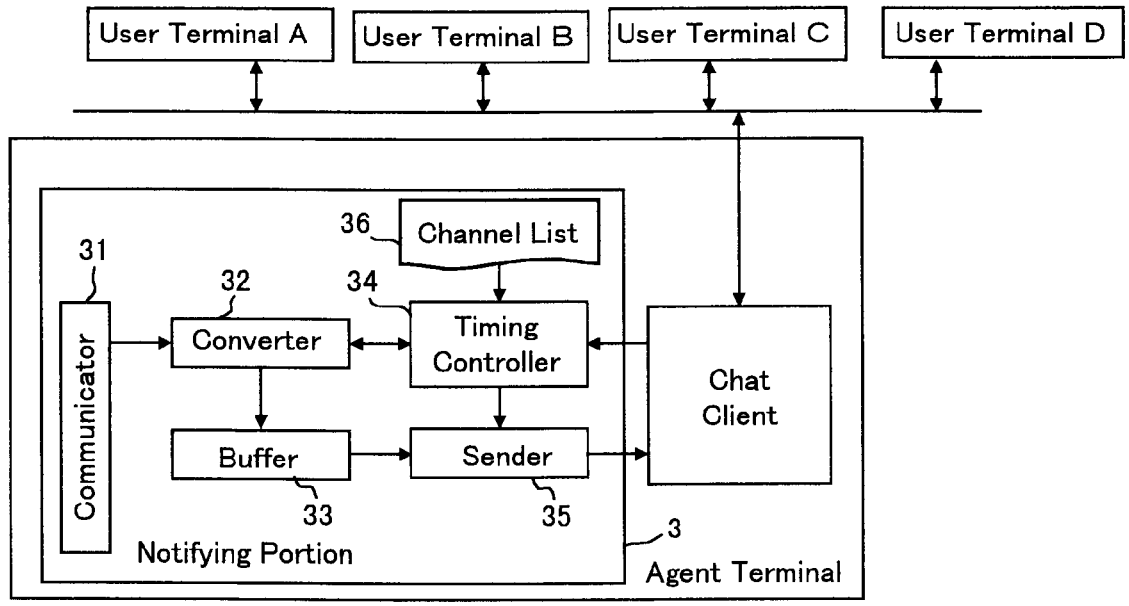
FIGS. 3A and 3B are a conceptual views showing the DB-Terminal list for use in statues change notification system in accordance with selected embodiments of the present invention.
FIG. 4 is a diagrammatic block chart showing a notifying portion for use in status change notification system in accordance with selected embodiments of the present invention.

FIGS. 3A and 3B shows examples of the DB-terminal lists 2. The DB-terminal lists 2 specify which databases are being monitored and which agent terminals are to be notified of status changes in a specified the database. FIG. 3A shows the DB-terminal list 2 for the DBMS 1. The list shows that the monitoring portion 1 of the DBMS 1 monitors the status of DB 1, and notification of a status change of DB1 is to be sent to the agent terminal A and agent terminal B.

FIG. 3B is a DB-terminal list for DBMS 2. The list shows that the monitoring portion 1 of the DBMS 2 monitors DB 2, and notification of a status change of the DB 2 is to be sent only to the agent terminal B. Although one DBMS administers one DB in the present embodiment, a DBMS can also administer a plurality of DBs if necessary.

Referring to FIG. 2, the monitoring portion 1 refers to the DB-terminal list 2 to determine which database should be monitored and to which agent terminal is to be notified of a status change of the identified database. The monitoring portion 1 checks a log of the database designated in the DBMS at predetermined periods of time to identify status changes. The monitoring portion 1 then compares the current log with a previous log to determine changes. A log is usually generated by the DBMS, and includes history of updates and changes to the DB. The period of time between two logs is not limited to any particular period, but may be determined so as to balance the burden on the monitoring portion 1 and the need for quick notification to the users.

Once a status change has been detected in the database, the monitoring portion 1 sends a notification of the status change to the designated agent terminal. The notification is achieved by sending notification data that includes predetermined information in a predetermined format. The predetermined information includes, for instance, name of DB, type of activity, date and time, information ID number within the DB, and content of the information. For instance, a notification may look like "DB1:update:1990123-2019:information ID0:title Announcement". A protocol to be utilized in notification to the agent terminal is not limited to any particular protocol. However, it is preferable that the notification is sent in the IRC protocol, such that the notifying portion 3 of the receiving agent terminal can forward the notification data to the channel of the IRC without converting the protocol.

Agent Terminal

As shown in FIG. 2, each agent terminal, such as agent terminal A and agent terminal B, includes a notifying portion 3 and a chat client. The chat client of the agent terminal sends a status change notification to the channel on which a chat is being conducted between various user terminals. FIG. 4 is a block chart showing the structure of the notifying portion 3. The notifying portion 3 includes a communicator 31, a converter 32, a buffer 33, a timing controller 34, a sender 35, and a channel list 36.

The communicator 31 receives a notification data from the monitoring portion 1, and sends the notification data to the converter 32.

The converter 32 converts the notification data to a predetermined format. Then, the converter 32 sets aside the converted notification data in the buffer 33. For instance, the converter 32 converts the notification such that users can read it easily. More specifically, the aforementioned example of notification "DB1:update:19990123-2019:information ID0:title Announcement" is converted into "NEWS (20:19) [information ID0] Announcement". If communication protocol between the monitoring portion 1 and the communicator 31 is not pursuant to the IRC protocol, the converter 32 converts the notification data in a data format pursuant to the IRC protocol. The converter 32 also sends a predetermined information to the timing controller 34 as needed. The information to be sent to the timing controller 34 is determined based on how the timing controller 34 is configured with respect to predetermined times at which status changes notification should be sent to the channel.

After the notification (hereinafter status change notification) is converted at the converter 32, the status change notification is stored in the buffer 33 temporarily. In this embodiment, the buffer 33 stores status change notifications in chronological order.

The timing controller 34 controls the timings at which the status change notification is sent from the buffer 33 to the channel. The timings are determined based on predetermined factors such as status of the channel and the predetermined information sent from the converter 32. The status of the channel includes, for instance, frequency of messages, the number of participants, change of topics, and change of channel administrator. In this and other embodiments, a default timing for transmission of notifications of status changes is when the channel achieves a status "No message has been made in the channel for 3 minutes", unless specified otherwise. In the event the channel achieves this status, the timing controller 34 receives from the converter 32 the name of a database in which the status change occurred. Then, the timing controller 34 determines the channel that corresponds to the database such that it can retrieve a record of messages in the channel from the chat client. The timing controller 34 then determines, based on the record of the messages, whether the status change notification should be sent out. If the status change notification should be sent, the timing controller 34 specifies the channel and directs the sender 35 to send the status change notification. If the status change notification is not to be sent yet, the timing controller 34 retrieves further records of messages in the channel every predetermined period of time, and waits until the record indicates that the status change notification can be sent.

Once the timing controller 34 directs that a status change notification should be sent, the oldest status change notification in the buffer 33 is sent to the designated channel.

Figures 5A, 5B, 6:
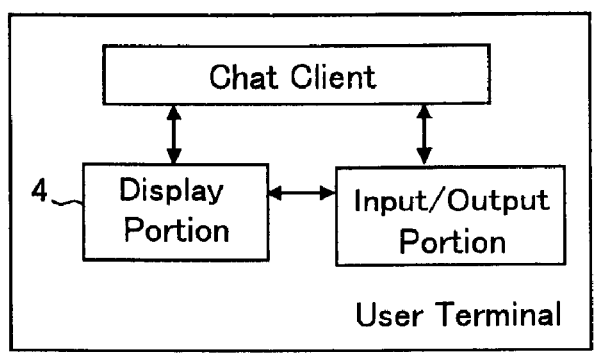
FIGS. 5A and 5B are conceptual explanatory view of a channel list for use in the status change notification system in accordance with several embodiments of the present invention.
FIG. 6 is a block chart showing a user terminal for use in the status change notification system in accordance with the first embodiment of the present invention.

Prior to determining the aforementioned timing, the timing controller 34 determines which channel the status change notification is to be sent. The channel is determined based on information in the channel list 36. FIGS. 5A and 5B show examples of the channel list 36. The channel list 36 specifies the database or databases being monitored and the channel status change notifications are to be transmitted to. FIG. 5A is a channel list 36 in the notifying portion of agent terminal A. The list indicates that status change notifications based on changes in DB 1 are to be sent to channel #CH1. FIG. 5B is a channel list 36 in the notifying portion of an agent terminal B. The list in FIG. 5B indicates that status change notifications based upon changes in DB 1 and DB 2 are to be sent to channel #CH2. The timing controller 34 looks for the name of database sent by the converter 32 in the channel list 36 to determine to which channel the status change notification should be sent. Thereafter, the timing controller 34 directs the sender 35 to send the status change notification to the channel specified in the channel list 36.

The sender 35 sends the status change notification from the buffer 33 to the designated channel as directed by the timing controller 34. In this embodiment, the status change notifications are stored in the buffer 33 in a chronological order. The sender 35 sends the oldest status change notification first. Once a status change notification is sent out, the sender 35 deletes the status change notification from the buffer 33.

User Terminal

FIG. 6 is a block chart that shows structure of a typical user terminal, such as the user terminals A, B C or D. Each user terminal includes a chat client, an input/output portion, and preferably a display portion 4. The display portion 4 extracts a status change notification sent to the channel from communication data in the channel. More specifically, the display portion 4 extracts a status change notification that has been converted in the predetermined format by the converter 32, such as a message that is in the format "DB*:::ID No.*:*". In this example, "*" is text. The display portion 4 then creates a notification region in the display to output the extracted status change notification in the notification region.

Figure 7:
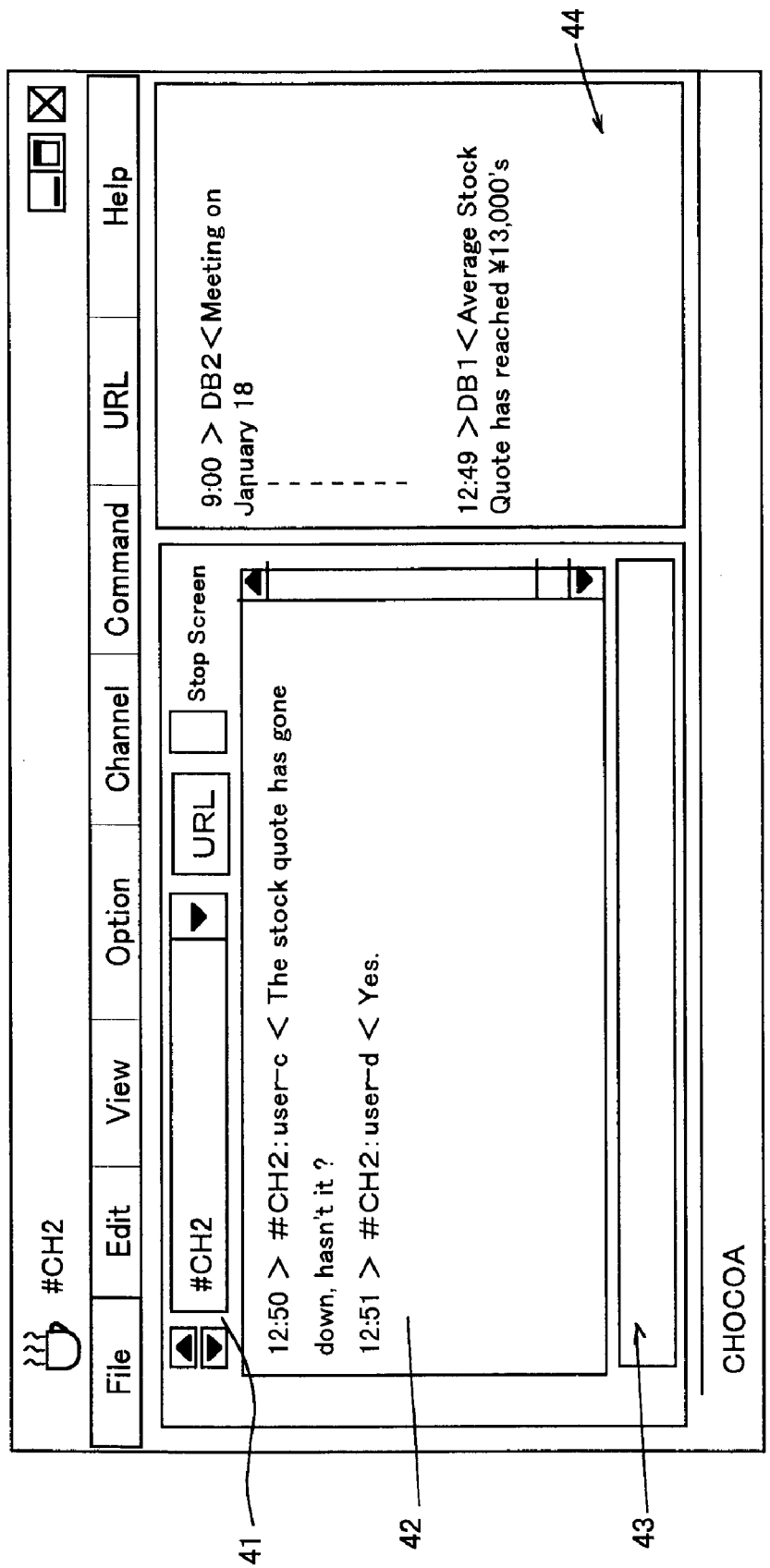
FIG. 7 is an explanatory view showing an example of a display showing a status change notification in accordance with the first embodiment of the present invention.

FIG. 7 is an example of a status change notification as displayed by the display portion 4. Specifically, FIG. 7 shows images created by the display portion 4 and displayed on the screen (display or monitor) of user terminals C and D, which participate in channel #CH2. The chat client displays a channel selection button 41, a message display region 42, and a message input region 43. The display portion 4 creates the notification region 44 and positions in on the screen. In the depicted example in FIG. 7, the notification region 44 is depicted to the right of the message display region 42 and the message input region 43. However it should be appreciated that the location of the notification region 44 is not limited to the depiction in FIG. 7. Regular messages in the channel #CH2 are displayed in the message display region 42. Status change notifications of DB 1 and DB 2 sent to channel #CH2 are displayed in chronological order in the notification region 44 on the right hand side of the screen.

Figure 8:
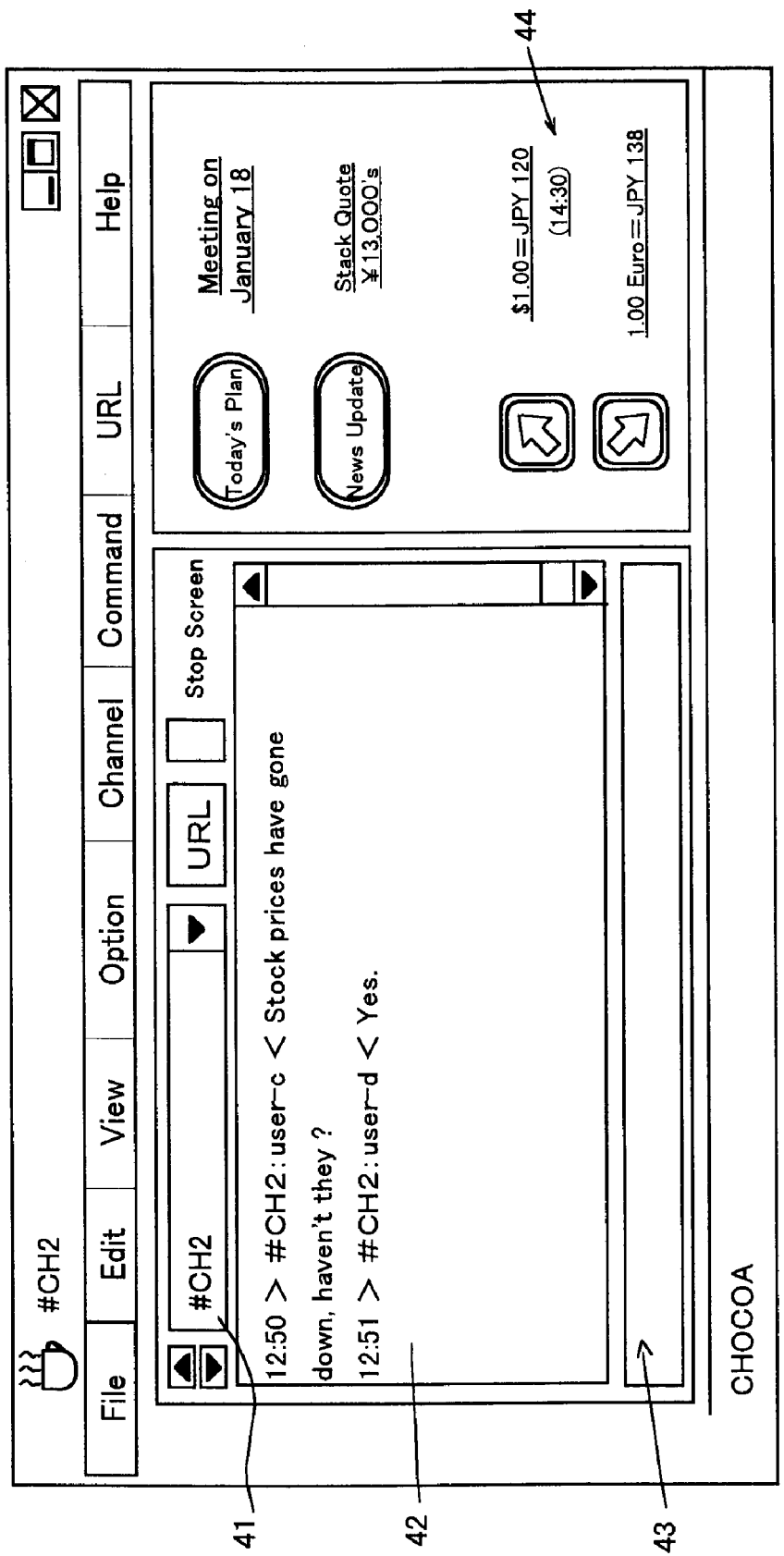
FIG. 8 is an explanatory view showing an example of how a status change notification is displayed with icons in accordance with the first embodiment of the present invention.

The status change notification can be displayed by visual means such as an icon, instead of text. FIG. 8 shows an example of status change notification display that utilizes icons. Specifically, FIG. 8 shows a display that includes icons that indicate upward change and downward change of the exchange rate.

It is furthermore preferable for a user terminal to have a DB access client (for example, software which facilitates access to a specific database). The DB access client allows a user to retrieve information directly from a predetermined database (DB). Once a user clicks on an icon for the DB access client, the display portion 4 sends information ID to the DB access client. Then, the DB access client retrieves detailed information under the information ID from the DB, which is then displayed in the screen. For instance, the button "News Update" may link directly to such a DB access client.

Although FIGS. 7 and 8 display the status change notification in a chronological order, the status change notification can be displayed in a different order as needed. For instance, the display portion 4 can sort the names of databases being monitored for status changes in an alphabetical order, with notifications for each DB being in a chronological order. It is also possible to display the status change notification without separating them from regular messages. In this case, a user terminal would not have the notification region 44, and the status change notifications are displayed in the common display region together with regular messages.

Process Flowcharts

Flow of the process executed by the monitoring portion 1 and the notifying portion 3 in accordance with the present embodiment is described below.

(1) Process of Monitoring Portion

Figure 9:
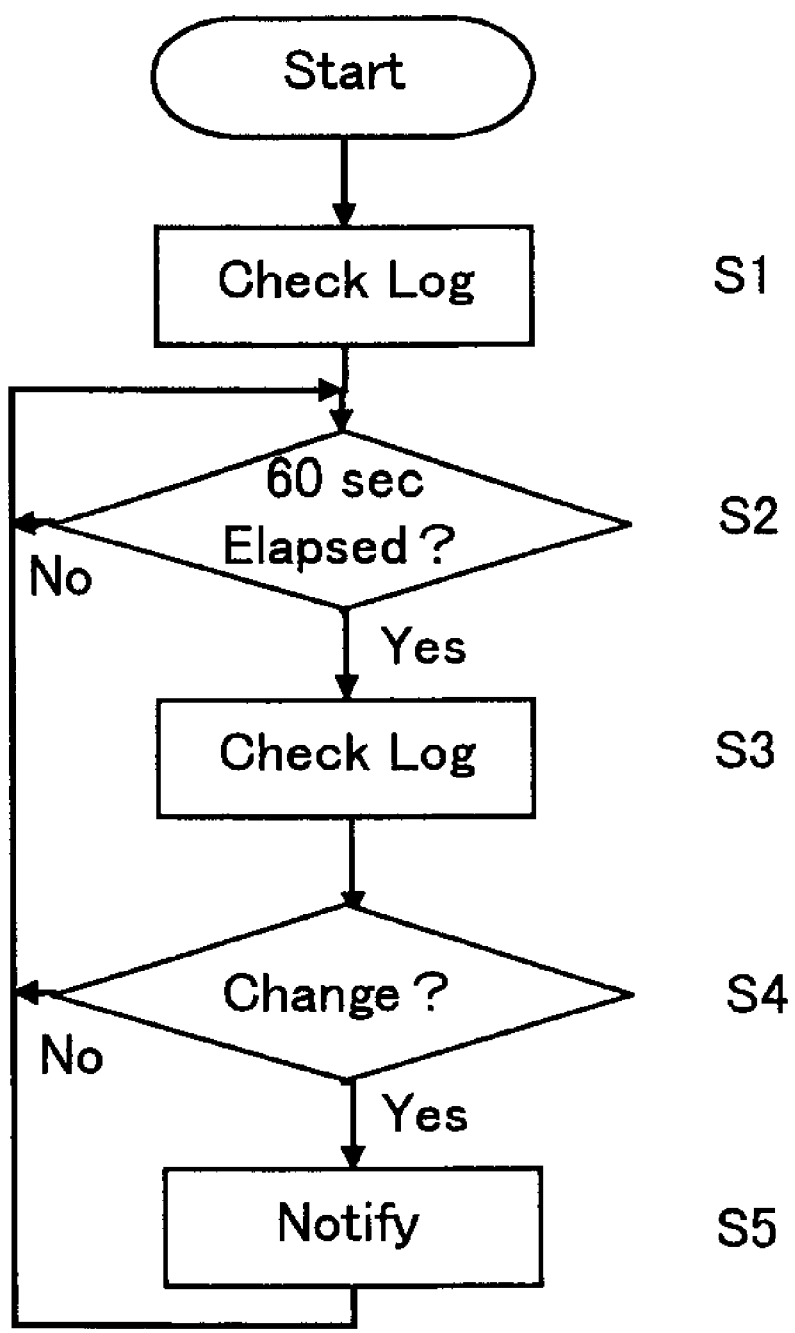
FIG. 9 is a flowchart showing a monitoring process that is executed by the monitoring portion in accordance with selected embodiments of the present invention.

A flow of a monitoring process conducted by the monitoring portion 1 is explained with reference to FIG. 9 which is a flowchart that shows a flow of the monitoring steps of the monitoring portion 1.

At step S1, the monitoring potion 1 retrieves update history of the database being monitored from a log maintained in the DBMS. The database being monitored is determined based on the aforementioned DB-terminal list 2.

At step S2, the monitoring portion 1 determines whether a predetermined period of time has elapsed since the last time it checked the log. In this example, the predetermined period of time is 60 seconds, although the present invention is not limited to this time period. Once it determines that 60 seconds have elapsed, the monitoring portion 1 proceeds to step S3. Otherwise, the monitoring portion 1 repeats step S2.

At step S3, the monitoring portion 1 checks the log again to retrieve update history.

At step S4, the monitoring portion 1 compares the update history that it has retrieved earlier and the update history that it has just retrieved, to see if any status changes have occurred in the status of the database. If the two update histories are identical, the monitoring portion 1 proceeds to step S2 to retrieve next update history. If the newer update history has any information that has been added after the older update history had been retrieved, the monitoring portion proceeds to step S5.

At step S5, the monitoring portion 1 retrieves from the newer update history the information that has been added or changed since receiving the previous update history. Thereafter, the monitoring portion creates a predetermined notification data, and sends it to the notifying portion 3.

(2) Process of Notifying Portion

A process of the notifying portion 3 in accordance with the present embodiment is explained below with reference to FIGS. 10A and 10B. The notifying portion 3 executes a receiving process and a sending process separately.

(1) Receiving Process

Figure 10A:
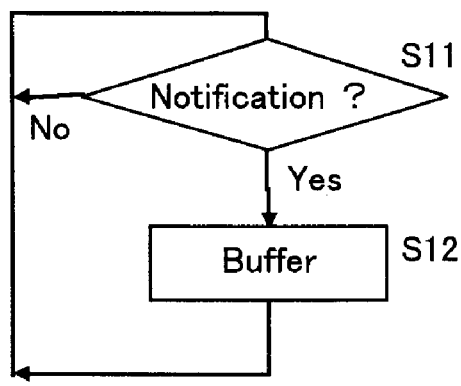
FIG. 10A is a flowchart showing a receiving process that is executed by the notifying portion in accordance with selected embodiments of the present invention.

FIG. 10A is a flowchart that shows a flow of the receiving process of the notifying portion 3.

At step S11, the converter 32 waits for a notification from the monitoring portion 1 via the communicator 31. Once the converter 32 receives a notification data, the converter 32 proceeds to step S12.

At step S12, the converter 32 converts the notification in a predetermined format, and sets aside the notification data in the buffer 33 in chronological order.

In other words, in the receiving process, the notifying portion 3 conducts an process of converting a notification data and storing it in the buffer 33 every time it receives notification data.

(2) Sending Process

Figure 10B:
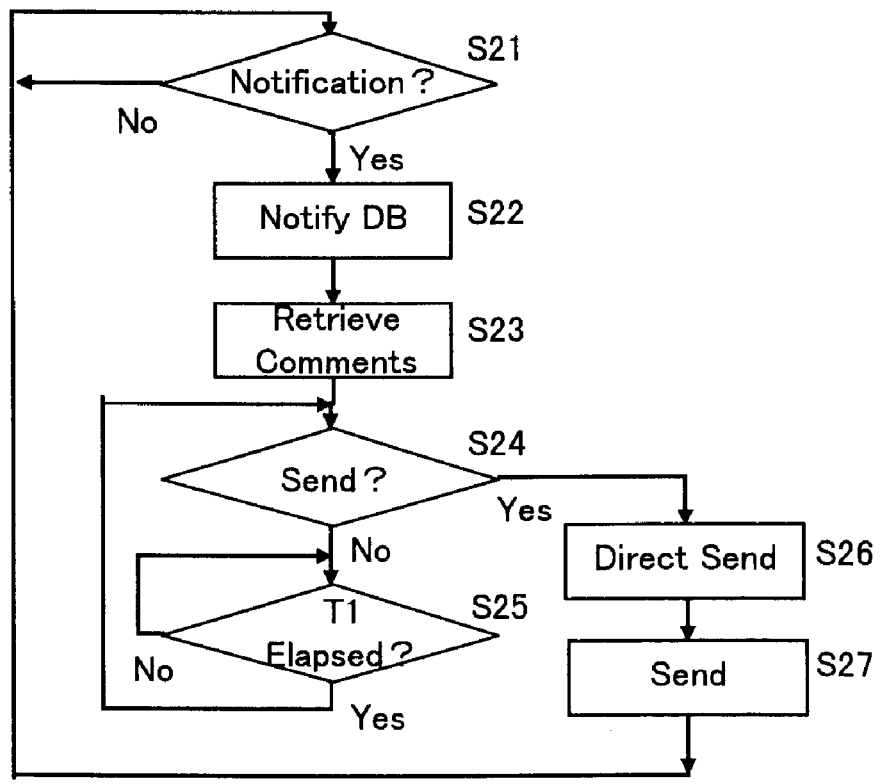
FIG. 10B is a flowchart showing a sending process that is executed by the notifying portion in accordance with selected embodiments of the present invention.

FIG. 10B is a flowchart that shows the flow of the sending process of the notifying portion 3.

At step S21, the converter 32 waits for a notification from the monitoring portion 1. Once the converter 32 receives a notification data, the converter 32 proceeds to step S22.

At step S22, the converter 32 sends the name of the DB in the notification to the timing controller 34.

At step S23, the timing controller 34 searches the notified name of the database in the channel list 36. In this manner, the timing controller 34 determines the channel that corresponds to the database. Then, the timing controller 34 retrieves a record of messages of the determined channel from the chat client.

At step S24, the timing controller 34 determines based on the record of messages whether a status change notification should be sent to the channel. If the time controller 34 decides to send the status change notification at that point of time, the timing controller 34 proceeds to step S26. Otherwise, the timing controller 34 proceeds to step S25.

At step S25, the timing controller 34 waits until a predetermined period of time T1 elapses. Once the predetermined period of time T1 elapses, the timing controller 34 goes back to step S24 to determine whether it should send the status change notification. In other words, the timing controller 34 keeps waiting until it determines that the status change notification can be sent.

At step S26, the timing controller 34 directs the sender 35 to send the status change notification to the channel specified in the channel list 36.

At step S27, the sender 35 retrieves the oldest status change notification from the buffer 33. Then, the sender 35 sends the status change notification to the designated channel via the chat client.

In other words, in the sending process, the notifying portion 3 sends a status change notification from the buffer at appropriate timings.

Second Embodiment

FIG. 11 shows an entire structure of the status change notification system in accordance with the second embodiment. This embodiment is similar to the first embodiment, except that the database (DB) is a mail DB. A mail DB is a database in which electronic mail for a mailing list are stored. For the sake of simplification, FIG. 11 shows a structure where there is only one mail DB. The timing at which posting of a mail is notified to the channel is determined in a similar manner as the manner described in the first embodiment. In this embodiment, the notifying portion 203 has a ML-CH TABLE 238 instead of a channel list. Also, each user terminal has an electronic mail device as well as a chat client. Otherwise, the present embodiment has a similar structure as the first embodiment. An electronic mail device is a device on a user terminal, which sends and receives electronic mail.

The monitoring portion 201 sends a predetermined set of notification data to the notifying portion 203 every time the mail DB receives an electronic mail to be posted in a mailing list. The notification data includes the name of the mailing list and a mail ID. The mail ID is an identification number to identify the electronic mail in the mail DB.

Figure 12:
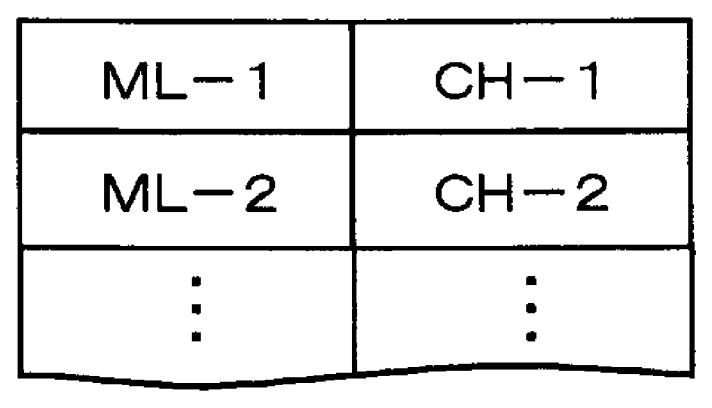

The notifying portion 203 includes a ML-CH table 236. FIG. 12 shows a conceptual view of the ML-CH table 236. The ML-CH table 236 correlates channels and mailing lists such that when an electronic mail to be posted in a certain mail list is received, the ML-CH table 236 specifies which channel should be notified of posting of the electronic mail. In other words, the ML-CH table 236 correlates user groups of mailing lists and user groups of channels.

The converter 232 notifies the name of the mailing list, instead of the name of the database, to the timing controller 234. The converter 232 also converts the notification data into a posting notification. The posting notification is a predetermined format that includes the name of the mailing list and mail ID.

The timing controller 234 searches the name of the mailing list in the ML-CH table 236 to obtain the channel that corresponds to the mailing list. The timing controller 234 also controls the timing at which the posting notification of the mail is sent to the channel. The timing controller 234 also directs the sender 235 to send the posting notification to the channel specified in the ML-CH table 236.

The sender 235 sends the posting notification to the designated channel. The posting notification is in a predetermined format. Other functions of the converter 232, the buffer 233, the timing controller 234, and the sender 235 are the same as in the first embodiment. Since the posting of the electronic mail is notified to the channel in the form of a message, users can be notified of the posting of the electronic mail even if they are not running the electronic mail device at the time when the electronic mail is posted. It is preferable that the users in the mailing list are the same as the users who participates, or are allowed to participate in the channel.

The flow of process is the same as in the first embodiment.

Third Embodiment

Figure 13:
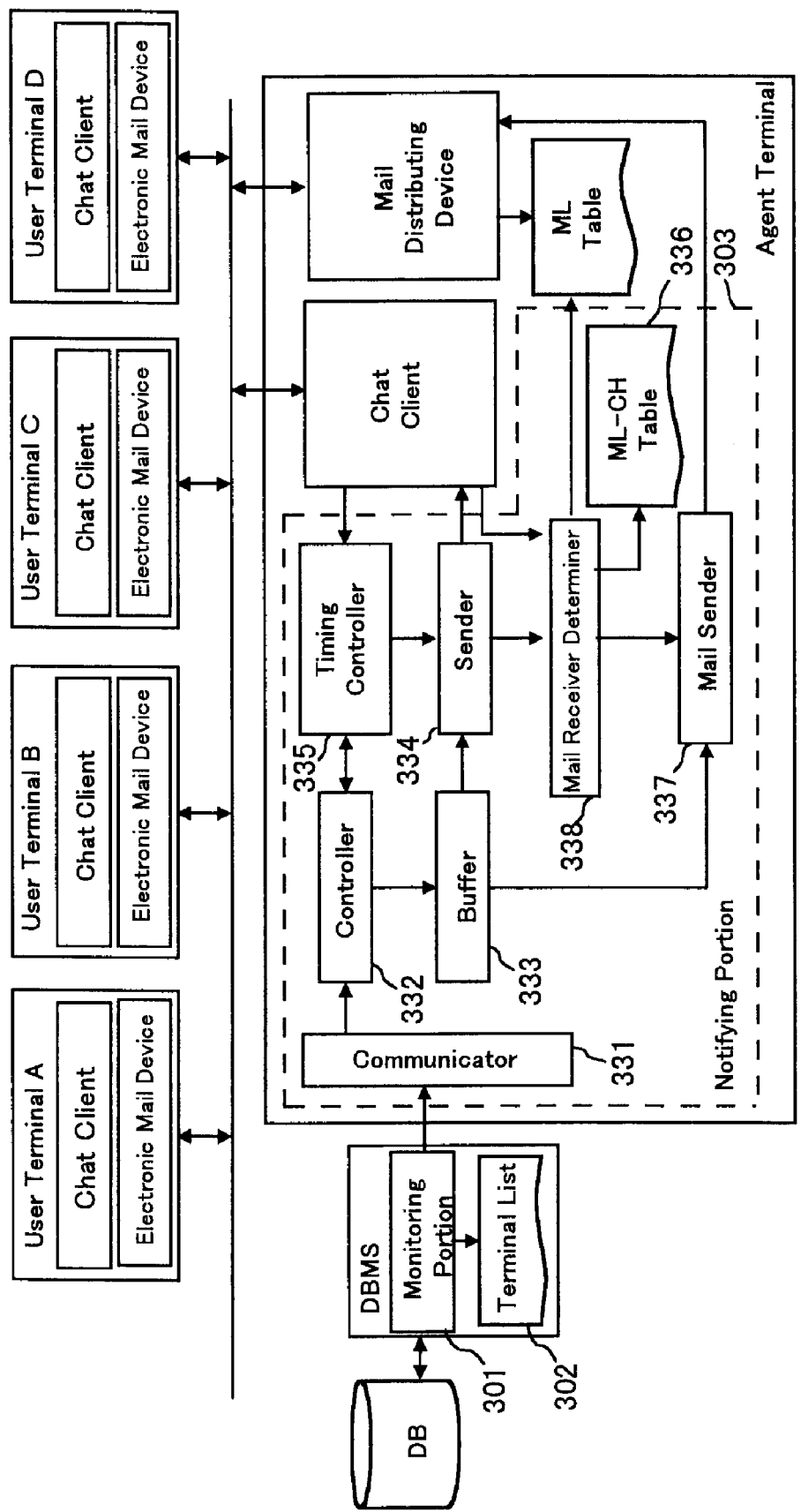
FIG. 13 is a diagrammatic block chart showing details of the structure of a status change notification system in accordance with a third embodiment of the present invention.

FIG. 13 shows the structure of a status change notification system in accordance with the third embodiment of the present invention. In the status change notification system of the third embodiment, the agent terminal has a mail distribution device. The notification portion 303 has a mail sender 337 and a mail receiver determiner 338. Each user terminal has an electronic mail device. Otherwise, the present embodiment has the same structure as the first embodiment. The mail distributing device receives electronic mails to be posted in a mailing list, and then distributes the electronic mails to user terminals that are listed in the designated mailing list. In the aforementioned second embodiment, users who do not participate in the channel are not notified of a status change. In this embodiment, however, users who do not participate in the channel are also notified of the status change via an electronic mail.

Structure

The mail distributing device has a ML table (Mail List table). FIG. 14 shows a conceptual view of the ML table. The ML table correlates mailing list and users who participate in the mailing list. For instance, the mailing list "ML–1" includes a user A (user-a@fujitsu.co.jp) and a user B (user-b@fujitsu.co.jp).

Functions of the monitoring portion 301, the terminal list 302, the communicator 331, the converter 332, the buffer 338, the timing controller 335, and the sender 334 are the same as in the first embodiment. However, the sender 334 has an additional function; after the sender 334 sends a status change notification, the sender 334 sends to the mail receiver determiner 338 the name of the channel to which the notification is sent. Another feature of the sender 34 which is different from the first embodiment is that the sender 334 does not delete from the buffer 333 the status change notification that has been sent out.

The mail receiver determiner 338 searches the name of the channel in the ML-CH table 336 to which the status change notification has been sent, and thereby determines the mailing list that corresponds to the channel. The ML-CH table 336 is the same as in the second embodiment, therefore will not be explained in detail. Then, the mail receiver determiner 338 looks for the name of the mailing list in the ML table attached to the mail distributing device, and thereby obtains the names of users listed in the mailing list. The mail receiver determiner 338 also receives from the chat client a list of users who participate in the channel. The mail receiver determiner 338 then compares the users listed in the mailing list and the users who participate in the channel. The users who are listed in the mailing list but do not participate in the channel are the ones to whom a notification electronic mail should be sent. In this manner, the mail receiver determiner 338 determines to whom the notification electronic mail should be sent. It is also possible to create a special mailing list and send the notification electronic mail to users listed in the special mailing list. In this case, the mail receiver determiner 338 does not need to obtain a list of user of the channel from the chat client. The names of users to whom the notification electronic mail should be sent are sent to the mail sender 337.

The mail sender 337 then retrieves the oldest status change notification from the buffer 333, and sends the status change notification to the mail distributing device along with the names of the users to whom the notification electronic mail should be sent. Then, the mail sender 337 deletes from the buffer 333 the status change notification that has been sent out.

Process Flow

The process flow in accordance with the present embodiment will now be described briefly. For the sake of simplification, it is assumed here that the timing at which status change notification is sent out is determined in the same manner as in the first embodiment. Also, a notification electronic mail is sent to the users who do not participate in the channel.

Figure 15:
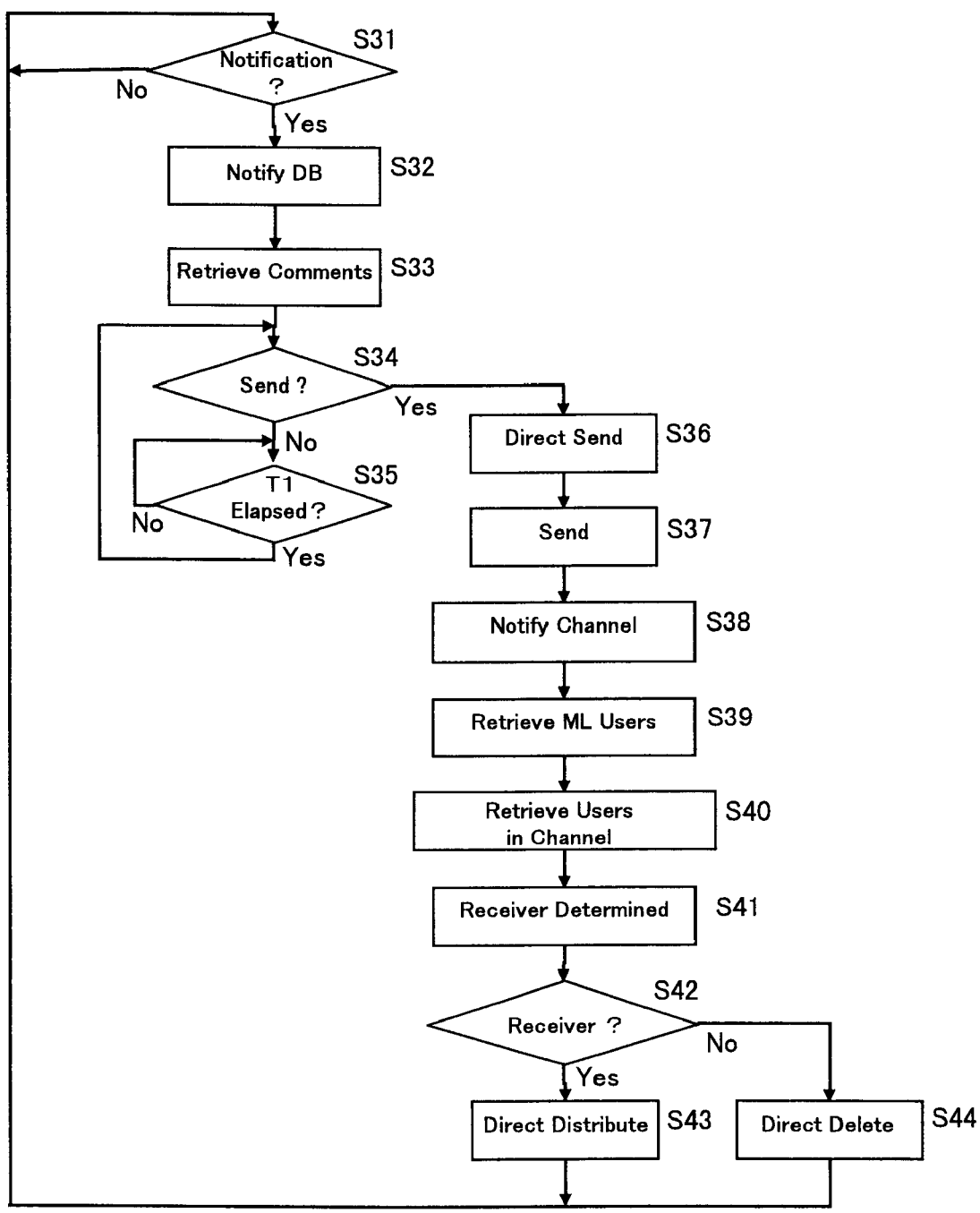
FIG. 15 is a flowchart showing the notifying process that is executed by a notifying portion in accordance with the third embodiment of the present invention.

FIG. 15 is a flowchart that shows a flow of the process executed by the notifying portion 303 in accordance with the present embodiment. The monitoring process of the monitoring portion 331 is the same as the monitoring process in the aforementioned first embodiment. Therefore, the monitoring process will not be explained in detail. Similar to the notification process of the first embodiment, the following process starts as the notifying portion 303 receives notification data. In the following process, steps S31–S37 are the same as steps S21–S27 of the first embodiment. Therefore, the process after the step S38 is explained below.

At step S38, after having sent the status change notification to the channel, the sender 334 sends to the mail receiver determiner 338 the name of the channel to which the status change notification has been sent.

At step S39, the mail receiver determiner 338 refers to the ML-CH table 336 and ML table to obtain the names of users listed in the mailing list that corresponds to the channel.

At step S40, the mail receiver determiner 338 obtains from the chat client the names of the users who participate in the channel to which the notification has been sent.

At step S41, the mail receiver determiner 338 specifies users who are listed in the mailing list but do not participate in the channel, and determines their mailing addresses as mail receiving addresses of the notification electronic mail.

At step S42, the mail receiver determiner 338 determines whether any mailing address has been determined as a mail receiving address. If there is a mail receiving address, the mail receiver determiner 338 proceeds to step S43. If there is no mail receiving address, the mail receiver determiner 338 proceeds to step S44. If there is no mail receiving address, it means that all the users listed in the mailing list participate in the channel.

At step S43, the mail receiver determiner 338 sends the receiving addresses to the mail sender 337 such that the mail sender 337 sends a notification electronic mail to the mail receiving addresses. The mail sender 337 retrieves the oldest status change notification from the buffer 333, and sends the status change notification to the mail distributing device along with the mail addresses to which the notification should be sent. Then, the mail sender 337 deletes the status change notification from the buffer 333 that has been sent out. The notifying portion 303 returns to step S31.

At step S44, the mail receiver determiner 338 directs the mail sender 337 to delete the status change notification from the buffer 333. Accordingly, the mail sender 337 deletes the oldest status change notification from the buffer 333. The notifying portion 303 returns to step S31.

Fourth Embodiment

Figure 16:
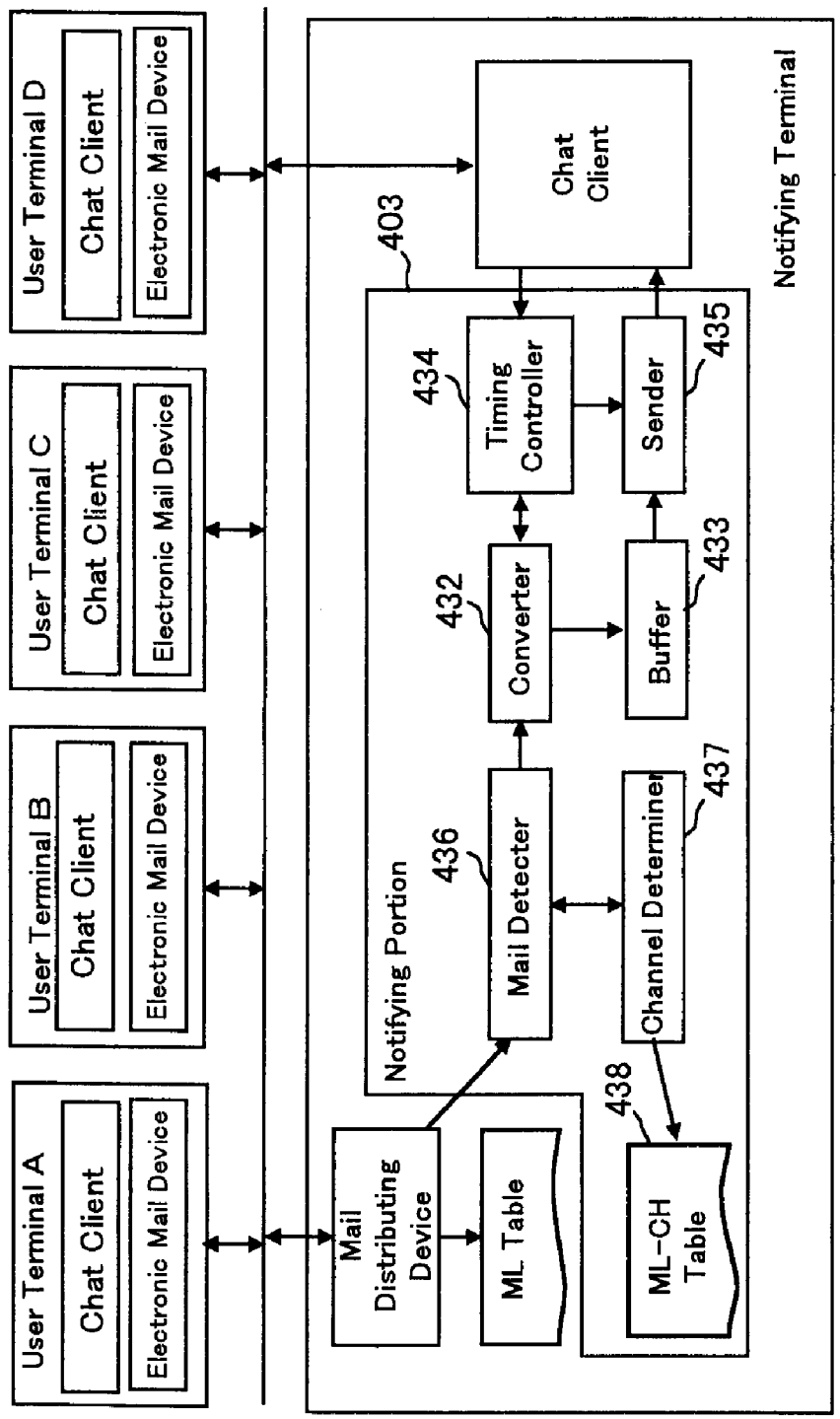
FIG. 16 is a diagrammatic block chart showing details of the structure of a status change notification system in accordance with a fourth embodiment of the present invention.

FIG. 16 shows the structure of a status change notification system in which receipt of an electronic mail that has been posted in a mailing list is notified by the chat system. The present embodiment is different from the second embodiment in that there is no mail DB that stores mails to be posted in the mailing list. The status change notification system in accordance with the present embodiment includes a notification terminal and a plurality of user terminals A–D. The notification terminal and the plurality of user terminals A–D are connected via the computer network. Similar to the second and third embodiments, user terminals have both chat client and the electronic mail device.

The notification terminal includes a mail distributing device, the notifying portion 403, and the chat client. The mail distributing device includes the ML table. The notifying portion includes the converter 432, the timing controller 434, the buffer 433, the sender 435, the mail detector 436, the channel determiner 437, and the ML-CH table 438.

As in the third embodiment, the ML table correlates the mailing list and addresses of users who are listed in the mailing list. The ML table in this embodiment is different from the one in the third embodiment in that each mailing list includes an electronic mail address of a mail detector 436. In other words, once an electronic mail is posted in a mailing list, the electronic mail is sent to each of the users who are in the mailing list and the mail detector 436 that corresponds to the mailing list.

Once the mail detector 436 receives an electronic mail to be posted in a mailing list, the mail detector 436 sends to the channel determiner 437 the name of the mailing list to which the electronic mail is addressed.

As in the second embodiment, the ML-CH table 438 correlates the mailing lists and the channels. The channel determiner 437 determines the channel that corresponds to the mailing list in which the electric mail is posted, by referring to the ML-CH table 438. The channel determiner 437 then reports the name of the channel to the mail detector 436. Then the mail detector 436 creates a notification data and sends the notification data to the converter 432. The notification includes a predetermined set of information and is in a predetermined format. Examples of predetermined information include the name of the channel, contents of the electronic mail, the name of the mailing list, and the time of posting.

The converter 432 converts the predetermined information in a predetermined format, in a manner described above. The predetermined information is then stored in the buffer 433. Also, information that is needed in determining the timing at which the status change notification should be sent is reported from the converter 432 to the timing controller 434. Other functions of the converter 432, the timing controller 434, the buffer 433, and the sender 435 are the same as in the first embodiment, and therefore will not be described in detail.

Process Flow

Figures 17, 18A, 18B:
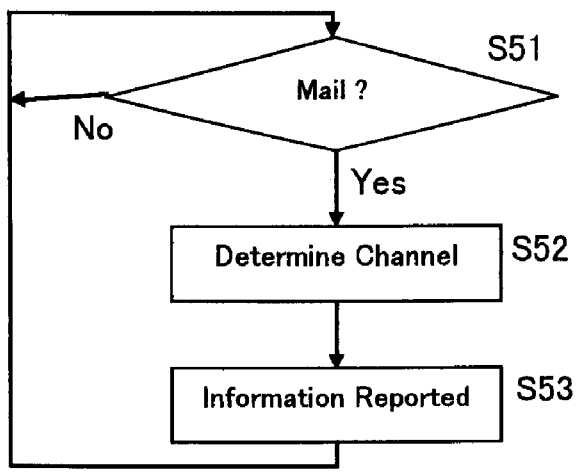
FIG. 17 is a flowchart showing a monitoring process that is executed by a monitoring portion in accordance with the fourth embodiment of the present invention.
FIGS. 18A and 18B are a conceptual explanatory view of a channel list for use in a status change notification system in accordance with a fifth embodiment of the present invention.

FIG. 17 is a flowchart that shows a flow of the monitoring process executed by the notifying terminal in the status change notification system in accordance with the fourth embodiment. Receipt of notification data and notification of status change notification occur in the same manner as in the first embodiment, therefore will not be explained in detail. As the mail distributing device receives from a user a mail to be posted in a mailing list, following process starts.

At step S51, an electronic mail to be posted to a mailing list is distributed to the mail detector 436. In other words, the mail detector 436 detects receipt of the electronic mail. Upon receiving the electronic mail, the mail detector 436 reports the name of the mailing list to the channel determiner 437.

At step S52, the channel determiner 437 determines the channel that corresponds to the mailing list by referring to ML-CH table 438. The channel determiner 437 then reports the name of the determined channel to the mail detector 436.

At step S53, the mail detector 436 sends to the converter 432 predetermined information such as the name of the mailing list, time of posting, contents, and the name of the channel.

The information sent to the converter 432 is stored in the buffer 433 and sent to the channel in the same manner as steps S21–S27 of the first embodiment. The present embodiment is different from the first embodiment in that the converter 432 sends to the timing controller 434 the name of the channel, instead of the name of the DB.

Fifth Embodiment

In the aforementioned first to fourth embodiments, the timing at which the status change notification should be sent is determined based on a certain condition of the channel, more specifically as "when there has been no message in the channel for the three minutes." The timing can also be determined based on other conditions. Some of the examples of the conditions will now be described.

(a) The Timing Determined Based on Time Information in the Notification

The notifying portion receives notification that includes dates and time at which the updated information becomes accessible. For instance, a notification may be "DB1: Update: 19990801-1200:Information ID0: Access Allowed: 20010101-1200: Title New Product Information". In this case, the timing controller determines the timing at which the status change notification should be sent as 12:00 on Jan. 1, 2001. The timing controller keeps this timing information until the determined date and time comes. At the determined date and time, the timing controller directs the sender to send the status change notification. Therefore, the timing controller has to check every certain period of time whether there is any status change notification that has to be sent out. Also, the status change notification has to have identification information to allow the timing controller to specify which of the status change notifications in the buffer is to be sent out. For instance, the buffer can store the status change notification such that the status change notifications correlate with time to be sent out.

If the content of the notification includes time information, the timing to send out the notification can be determined based on the time information. It is also possible to limit the range of time, such as 9:00–17:00, only during which the status change notification can be sent out. For instance, a schedule "Meeting on January 18" is registered on January 7 in a schedule DB1 that stores schedules. The notification for this schedule is "DB1:Registration:1990107-10:50:Information ID0: Title Meeting on January 18." The timing controller receives "January 18" from the converter, and thereby sets the timing as January 18, 9:00. On January 18 at 9:00, the timing controller directs the sender to send the information. The sender looks for the date and time in the buffer to obtain corresponding information. The sender then sends out the information as a message via the chat client. As described above, the timing controller memorizes the date and time, and constantly checks whether the timing has come. Also, as stated above, the status change notification has to have identification information to identify the status change notification in the buffer.

(b) The Notification to be Sent When the Notification Contains a Predetermined Keyword.

It is also possible to set the timing to send the status change notification as "when the status change notification contains a predetermined keyword." Referring to FIGS. 18A and 18B, the channel list correlates channels and keywords of each channel. In FIG. 18B, the keyword for channel #CH2 is "Stock Quote". The timing controller receives "Title" of the notification from the converter, and sends out the status change notification to #CH2 only when "Title" of the notification includes "Stock Quote." For instance, the time controller sends the status change notification when the notification data is "DB1:Update:19990801-1200:Information ID0:Title Stock Quote Information."

Sixth Embodiment

In the aforementioned first through third embodiments, the monitoring portion checks the log of the DBMS every predetermined period of time. Instead, the DBMS can send a notification to the monitoring portion every time it updates the log.

EFFECT OF INVENTION

The present information allows users who share the network to be notified of a status change on a real time basis, when the status change occurs outside the network. As a result, the users can conduct communication on an assumption that all of the users share the same information.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A status change notification system comprising:

groups of information terminals that are adapted to conduct communication via a chat system channel;

storing means disposed outside the chat system channel for storing information therein; and monitoring means for monitoring a status change in said storing means, and being adapted to generate a notification when a status change occurs, at least one of the information terminals having notifying means for receiving the notification of the status change from said monitoring means and sending the notification to the chat system channel to notify other information terminals in the chat system channel of the status change in a broadcasting manner, wherein said monitoring means further includes a first correlation table which correlates said storing means, said monitoring means, and said notifying means; and said monitoring means determines based on said first correlation table which of a plurality of said notifying means should be notified of the status change.

2. A status change notification system comprising:

groups of information terminals that are adapted to conduct communication via a chat system channel;

storing means disposed outside the chat system channel for storing information therein; and monitoring means for monitoring a status change in said storing means, and being adapted to generate a notification when a status change occurs, at least one of the information terminals having notifying means for receiving the notification of the status change from said monitoring means and sending the notification to the chat system channel to notify other information terminals in the chat system channel of the status change in a broadcasting manner, wherein said notifying means further includes a second correlation table which correlates a group of chat system channels and said notifying means; and said notifying means determines based on said second correlation table to which chat system channel the notification should be sent.

3. A status change notification system comprising:

groups of information terminals that are adapted to conduct communication via a chat system channel;

storing means disposed outside the chat system channel for storing information therein; and monitoring means for monitoring a status change in said storing means, and being adapted to generate a notification when a status change occurs, at least one of the information terminals having notifying means for receiving the notification of the status change from said monitoring means and sending the notification to the chat system channel to notify other information terminals in the chat system channel of the status change in a broadcasting manner, wherein said notifying means controls timing the status change notification sent to the chat system channel based on a predetermined condition.

4. A status change notification system as set forth in claim 3, wherein:

said storing means is a mail DB that stores electronic mails;

said monitoring means notifies said notifying means that an electronic mail has been posted, the electronic mail being sent to a predesignated address; and said notifying means sends the notification of posting of the electronic mail to the chat system channel shared by said group of information terminals.

5. A status change notification system as set forth in claim 3, wherein:

said information terminal includes an electronic mail distributing device and a list of predetermined groups of information terminals as well as said notifying means, said electronic mail distributing device adapted to distribute electronic mails; and said notifying means includes mail receiver determination means for determining mail receivers based on said list and the information terminals that communicate over the chat system channel to which the status change notification is sent, said electronic mail distributing device sending the status change notification to the mail receivers; and mail sending means for sending the status change notification to the mail receivers through said electronic mail distributing device.

6. A status change notification system comprising:

groups of information terminals that are adapted to conduct communication via a chat system channel;

storing means disposed outside the chat system channel for storing information therein; and monitoring means for monitoring a status change in said storing means, and being adapted to generate a notification when a status change occurs, at least one of the information terminals having notifying means for receiving the notification of the status change from said monitoring means and sending the notification to the chat system channel to notify other information terminals in the chat system channel of the status change in a broadcasting manner, wherein said notifying means includes:

queuing means for queuing the status change notification sent from said monitoring means;

controlling means for determining a timing at which the status change notification should be sent, and directing the notification to be sent according to the decision; and transmitting means for sending the status change notification from said queuing means to the chat system channel according to the direction from said controlling means.

7. A status change notification system as set forth in claim 6, wherein:

said notifying means further includes conversion means for converting the status change notification sent from said monitoring means in a predetermined format; and said information terminal further includes display means for extracting the status change notification from communication data within the chat system channel, and displaying the status change notification which has been converted in the predetermined format, said information terminal receiving the status change notification via the chat system channel.

8. A status change notification system as set forth in claim 6, wherein said controlling means determines based on status of the chat system channel a timing at which the status change notification should be sent.

9. A status change notification system as set forth in claim 6, wherein said controlling means determines based on time information of the status change notification timing at which the status change notification should be sent, if the status change notification from said monitoring means includes the time information.

10. A status change notification system as set forth in claim 6, wherein said notifying means further includes conversion means for converting the status change notification sent from said monitoring means in a predetermined format.

11. A notifying device disposed on at least one of a group of information terminals that are adapted to conduct communication via a chat system channel, said notifying device receiving from outside the chat system channel a notification of a status change and sending the status change notification to the chat system channel at a predetermined time such that the status change is notified to other information terminals in the chat system channel in a broadcasting manner, the status change occurring in an external database having information stored therein, wherein said notifying device comprises:
- a queuing device for queuing the status change notification;
- a controlling device for determining a time at which the status change notification should be sent, and directing the notification to be sent according to the decision; and
- a transmitting device for sending the status change notification from said queuing device to the chat system channel according to the direction from said controlling device.

12. A monitoring device adapted to be used with a controlling device that controls an external database having information stored therein, said monitoring device monitoring a status change of the database, and notifying one of the group of information terminals of the status change such that the status change is notified to the group of information terminals in a broadcasting manner, the group of information terminals conducting communication via a chat system channel, at least one of the groups of information terminals having notifying means for receiving the notification of the status change from said monitoring means and sending the notification to the chat system channel to notify other information terminals in the chat system channel of the status change in a broadcasting manner, wherein said monitoring means further includes a first correlation table which correlates said storing means, said monitoring means, and said notifying means, and wherein said monitoring means determines based on said first correlation table which of a plurality of said notifying means should be notified of the status change.

13. A notifying device disposed on at least one of a group of information terminals that are adapted to conduct communication via a chat system channel, said notifying device receiving from outside the chat system channel a notification of a status change and sending the status change notification to the chat system channel at a predetermined time such that the status change is notified to other information terminals in the chat system channel in a broadcasting manner, the status change occurring in an external database having information stored therein, wherein said notifying device controls timing the status change notification sent to the chat system channel based on a predetermined condition.

14. A status change display device disposed on information terminals that are adapted to conduct communication via a chat system channel, said display device extracting a status change notification that notifies of a status change of an external database, and displaying the status change notification visually, the database having information stored therein, the status change notification being in a predetermined format, wherein the status change display device operates with a notifying device disposed on at least one of a group of information terminals that are adapted to conduct communication via the chat system channel, said notifying device receiving from outside the chat system channel a notification of a status change and sending the status change notification to the chat system channel at a predetermined time such that the status change is notified to other information terminals in the chat system channel in a broadcasting manner, the status change occurring in an external database having information stored therein, wherein said notifying device comprises:
- a queuing device for queuing the status change notification;
- a controlling device for determining a time at which the status change notification should be sent, and directing the notification to be sent according to the decision; and
- a transmitting device for sending the status change notification from said queuing device to the chat system channel according to the direction from said controlling device.

15. A computer-readable recording medium having a monitor-notification program therein, the monitor-notification program being for use in a control device that controls an external database having information stored therein, said monitor-notification program adapted to execute operations comprising:

monitoring a status change in the database; and transmitting a notification in response to a status change thereby notifying a predetermined one of a group of information terminals such that the status change is thereafter transmitted to other information terminals in a chat system channel in a broadcasting manner, the group of information terminals conducting communication via the chat system channel, at least one of the groups of information terminals having notifying means for receiving the notification of the status change and sending the notification to the chat system channel to notify other information terminals in the chat system channel of the status change in a broadcasting manner, wherein a first correlation table correlates the monitoring and the notifying, further comprising:
- determining based on said first correlation table which of a plurality of said notifying means should be notified of the status change.

16. A computer-readable recording medium having a broadcasting notification program therein, said broadcasting notification program being for use in at least one of a group of information terminals that conduct communication via a chat system channel, said broadcasting notification program adapted to execute operations comprising:

receiving from outside the chat system channel a notification that notifies of a status change in an external database having information stored therein; and sending the notification to the chat system channel at a predetermined time such that the status change is notified to other information terminals in the chat system channel in a broadcasting manner, wherein the notification of the status change is sent to the chat system channel based on a predetermined condition.

17. A computer-readable recording device having a status display program therein, said status display program being for use in information terminals that conduct communication via a chat system channel, said status display program adapted to execute operations comprising:

extracting a notification from communication data within the chat system channel, the notification being in a predetermined format and notifying of a status change of an external database that has information stored therein;

outputting the extracted notification visually;

conducting communication via the chat system channel;

receiving from outside the chat system channel a notification of a status change;

sending the status change notification to the chat system channel at a predetermined time such that the status change is notified to other information terminals in the chat system channel in a broadcasting manner, the status change occurring in an external database having information stored therein;

queuing the status change notification;

determining a time at which the status change notification should be sent, and directing the notification to be sent according to the decision; and sending the status change notification to the chat system channel according to the determining.

18. A status change notification method comprising:

adapting groups of information terminals to conduct communication via a chat system channel;

storing information outside the chat system channel in a storing means;

monitoring a status change in the storing means, and generating a notification when a status change occurs;

receiving the notification of the status change from the monitoring means in at least one of the groups of information terminals;

sending the notification to the chat system channel to notify other information terminals in the chat system channel of the status change in a broadcasting manner; and controlling timing the status change notification sent to the chat system channel based on a predetermined condition.

19. A notifying device disposed on at least one of a group of information terminals that are adapted to conduct communication via a chat system channel, said notifying device receiving from outside the chat system channel a notification of a status change and sending the status change notification to the chat system channel at a predetermined time such that the status change is notified to other information terminals in the chat system channel in a broadcasting manner, the status change occurring in an external database having information stored therein, wherein said notifying device further includes a correlation table which correlates a group of chat system channels and said notifying device, and wherein said notifying device determines based on said correlation table to which chat system channel the notification should be sent.

20. A mail notification device for use in an electronic mail distributing device that is adapted to send an electronic mail addressed to groups of information terminals, the electronic mail being sent to each information terminal of a group of information terminals, the groups of information terminals conducting communication via a chat system channel, said mail notification device comprising:

detecting means for detecting an electronic mail addressed to any of the groups of information terminals and determining the address to which the electronic mail should be sent, said detecting means being included in the groups of information terminals;

a table for correlating the groups of information terminals and a plurality of chat system channels;

determining means for determining based on said table the chat system channel that corresponds to the group of information terminals to which the electronic mail is addressed; and notifying means for sending the notification of posting of the electronic mail to the determined chat system channel, wherein said notifying means controls timing the status change notification sent to the chat system channel based on a predetermined condition.

* * * * *

UNITED STATES PATENT AND TRADEMARK OFFICE
CERTIFICATE OF CORRECTION

PATENT NO.    : 6,735,615 B1
DATED         : May 11, 2004
INVENTOR(S)   : Noboru Iwayama et al.

It is certified that error appears in the above-identified patent and that said Letters Patent is hereby corrected as shown below:

Title page,
Item [54], References Cited, U.S. PATENT DOCUMENTS, please add
-- 5,642,483   1/1997       Topper --;
FOREIGN PATENT DOCUMENTS, please add
-- EP   0 876 029 A2   11/1998 --.

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,735,615 B1
DATED : May 11, 2004
INVENTOR(S) : Noboru Iwayama et al.

It is certified that error appears in the above-identified patent and that said Letters Patent is hereby corrected as shown below:

Title page,
Item [56], References Cited, U.S. PATENT DOCUMENTS, please add
-- 5,642,483    1/1997        Topper --;
FOREIGN PATENT DOCUMENTS, please add
-- EP    0 876 029 A2   11/1998 --.

This certificate supersedes Certificate of Correction issued November 9, 2004.

Signed and Sealed this

Twenty-ninth Day of March, 2005

JON W. DUDAS
*Director of the United States Patent and Trademark Office*